(No Model.) 2 Sheets—Sheet 1.
A. J. HALL.
CORN PLANTER.
No. 473,663. Patented Apr. 26, 1892.
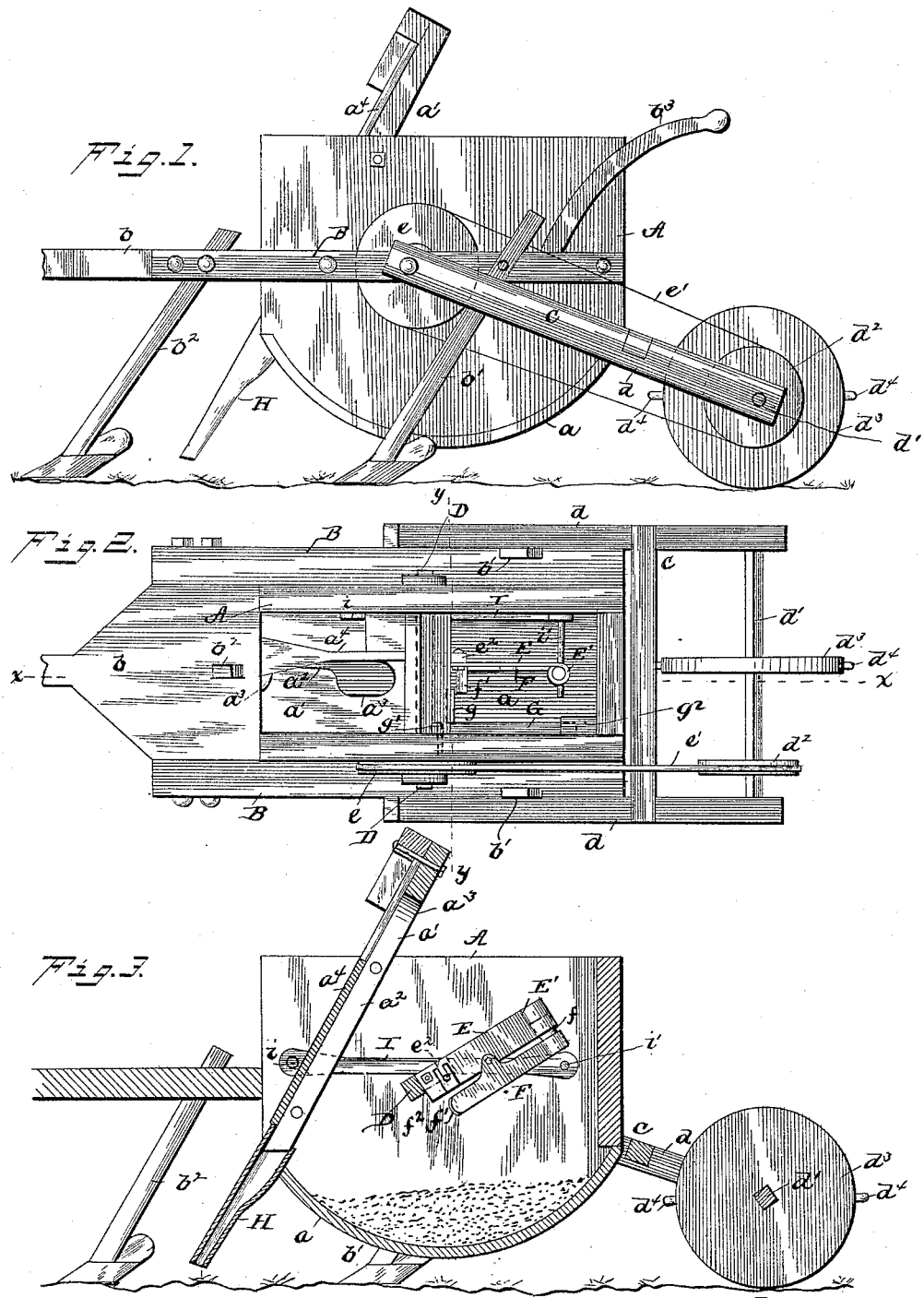
Witnesses
Wm. S. Hodges
D. A. Millrick
Inventor
Andrew J. Hall
By Patrick O'Farrell
Attorney (No Model.) 2 Sheets—Sheet 2.
A. J. HALL.
CORN PLANTER.
No. 473,663. Patented Apr. 26, 1892.
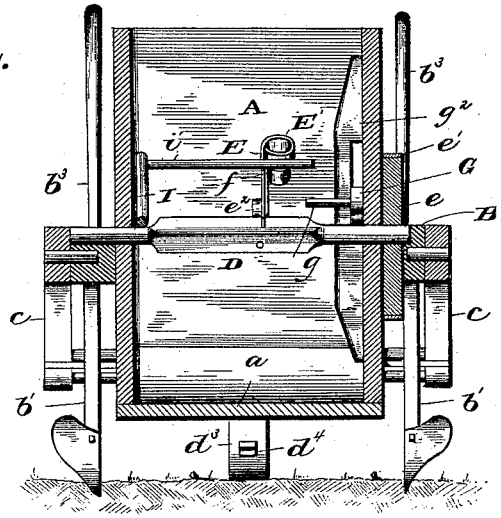
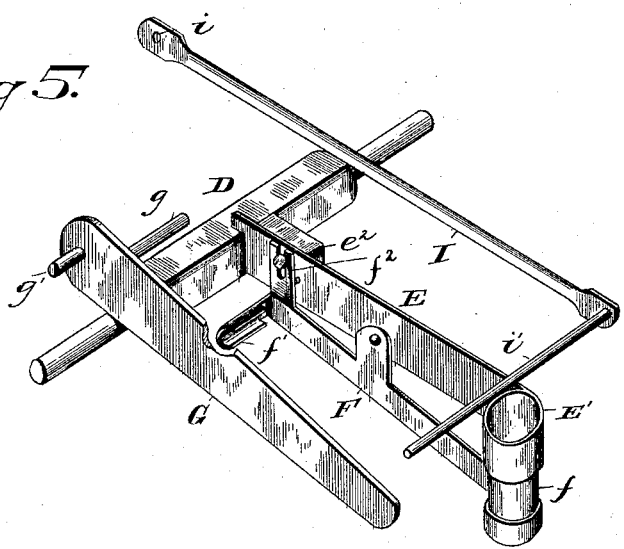
Witnesses Inventor

UNITED STATES PATENT OFFICE.

ANDREW J. HALL, OF CARMEL, TENNESSEE, ASSIGNOR OF ONE-HALF TO J. W. DUNN.

CORN-PLANTER.

SPECIFICATION forming part of Letters Patent No. 473,663, dated April 26, 1892.

Application filed October 9, 1891. Serial No. 408,271. (No model.)

*To all whom it may concern:*

Be it known that I, ANDREW J. HALL, a citizen of the United States of America, residing at Carmel, in the county of Montgomery and State of Tennessee, have invented certain new and useful Improvements in Corn-Planters, of which the following is a specification, reference being had therein to the accompanying drawings.

This invention relates to a new and improved planter for corn, cotton-seed, grain of all kinds, and also fertilizer; and it has for its object the production of a cheap, simple, and highly-efficient machine of this class whereby an accurate and positive feeding or planting is obtained.

The invention comprises a hopper or receptacle, plows projecting therefrom, a frame pivotally secured and carrying a driving and indicating wheel and pulley, a rotary shaft revolving in said hopper or receptacle and having a cup for receiving the seed or grain, and a plunger for forcing such seed or grain from said cup into a chute leading to the front of the machine.

The invention further comprises the detail construction, combination, and arrangement of parts, substantially as hereinafter fully set forth, and particularly pointed out in the claims.

In the accompanying drawings, Figure 1 is a side elevation of my improved planter. Fig. 2 is a plan view thereof. Fig. 3 is a longitudinal sectional view on the line $x\, x$, Fig. 2. Fig. 4 is a transverse sectional view on the line $y\, y$, Fig. 2. Fig. 5 is a detail perspective view.

Referring to the drawings, A designates a hopper or receptacle having a lower curved bottom $a$ and an inclined front wall or partition $a'$ secured between its sides and extended above the upper edge of the latter. In this inclined wall or partition is a slot or opening $a^2$, having enlarged or elongated ends $a^3$. To a projection of the upper end of this inclined wall or partition $a'$ is rigidly secured one end of a spring bar or plate $a^4$, which serves as a cut-off, the same being widened at that portion extended over slot $a^2$.

B B designate two parallel side bars secured to the sides of hopper A, and to their forward ends is connected the rear end of a tongue $b$. From these side bars B and the rear end of tongue $b$ project plow-standards $b'\, b^2$, and in rear of the former are handle-arms $b^3$.

C designates a frame composed of two parallel bars $d$, pivotally connected at their forward ends to side bars B, and to their outer rear ends is connected an axle $d'$, upon which is mounted a pulley $d^2$ and a drive-wheel $d^3$, from the periphery of which project diametrically-opposite lugs $d^4$, which latter will indicate the point of deposit of the seed or grain.

D is a shaft passed transversely through hopper A and having its ends supported by bars B. Upon this shaft at one end is a pulley $e$, around which is passed a belt $e'$, which also encompasses pulley $d^2$.

To an arm or projection $e^2$ of shaft D is secured one end of a plate E, the outer end of which is bent or coiled to form a cup E', designed to receive and convey the grain or seed. To this plate E is pivotally connected a lever F, the outer end of which has secured thereto a plug $f$, which fits snugly within cup E' and is designed to act as a plunger in forcing the grain or seed thereform. A stop $f^2$ is secured on one side of plate E near the shaft D, and the same is designed to limit the movement of lever F. The inner end of this lever F is bent and slightly curved, as shown at $f'$, and the same is designed to engage a lug or projection $g$ of an arm or lever G, pivoted at $g'$ to the inner side of hopper A, the other end of said lever being guided by a loop or bracket $g^2$, also secured to the inner side of said hopper. In the revolution of shaft D the bent or angular end of lever F will engage lug or projection $g$, and in being freed therefrom the lever will be given a spring, and its plunger at the other end will be forced through the grain-carrying cup, and thereby eject the grain into a chute H, secured to the wall or partition $a'$.

I designates an arm, which is pivotally mounted at $i$ to the inner side of one of the walls of hopper A, and from its free end projects at right angles thereto a finger $i'$, which extends over the line of travel of the grain-cup E', and is designed to serve as a scraper and effect the removal of all surplus grain from the outer end of said cup.

In practice the lugs $d^4$ on wheel $d^3$ are made to conform to the distances between the hills where the seed or grain is planted. Motion being given to shaft D, the grain-cup will be made to travel through the hopper, and as the same is about to leave the grain the plunger is at the inner limit of its movement, and as said cup passes out through the upper elongation of slot $a^2$ in wall or partition $a'$ the bent end of lever F engages the lug or projection $g$, and in the further movement of said shaft and the passage of said cup forward said bent end of lever F frees itself, and the plunger will immediately force the grain from the cup. In this passage of the grain-cup the plate E, being projected through slot $a^2$, will force the spring bar or plate $a^4$ to one side, and immediately upon said grain-cup re-entering the hopper through the lower elongation of said slot said bar or plate will assume its normal position.

The advantages of my invention are apparent, and it will be especially observed that by means thereof I can plant grain and seed of all kinds, and also that by providing the hopper with a longitudinal partition and duplicating the carrying-cup and plunger one machine can be made to plant or distribute grain and fertilizing material during the same operation.

A planter thus constructed is extremely simple, inexpensive, and durable, and is not liable to readily get out of order or fail in its operation.

I claim as my invention—

1. The herein-described improved planter, comprising the hopper or receptacle, the rotary shaft passed transversely therethrough, means for rotating said shaft, the grain-carrying cup secured to said shaft and designed to revolve therewith, the spring-impelled plunger fitting in said cup, a trip for forcing said plunger therein and ejecting the grain therefrom, and the finger pivotally secured in said hopper and serving as a scraper over the end of said cup, substantially as set forth.

2. The herein-described improved planter, comprising the hopper or receptacle, the rotary shaft passed transversely therethrough, the plate secured to said shaft and having a grain-carrying cup at its outer end, the lever pivotally secured to said plate and having a plug attached to one end fitting said cup, and a trip for said lever for forcing said plunger in said cup, substantially as set forth.

3. The herein-described improved planter, comprising the hopper or receptacle, the rotary shaft passed transversely therethrough, the plate secured to said shaft and having its outer end curved or bent back upon itself, forming a grain-cup, the lever pivotally secured to said plate and having a bent or angular end, and a projection at its outer end fitting said grain-cup, and an arm or lever pivotally secured to the inner side of said hopper and having a lug or projection with which said bent or angular end of said lever engages, substantially as set forth.

4. The combination, with the hopper or receptacle having its front wall or partition provided with a slot or opening, of a spring bar or plate designed to cover said slot or opening, and a rotary shaft passed transversely through said hopper or receptacle, carrying a grain-cup designed to be projected through said slot or opening, substantially as set forth.

5. The combination, with the hopper or receptacle, of the rotary shaft extended transversely therethrough, the plate secured to said shaft, having a grain-cup at its outer end, and an arm pivoted at one end to the inner side of said hopper and having a right-angular finger serving as a scraper at its free end, substantially as set forth.

6. The combination, with the hopper or receptacle having its front wall or partition provided with a slot or opening, of a spring bar or plate normally extended over said slot or opening, the parallel bars between which said hopper or receptacle is secured, the plows projecting from said bars, the scrapers also projecting therefrom, the shaft extended transversely through said hopper or receptacle and having a pulley thereon, the grain-carrying cup projecting from said shaft, the lever having a plunger fitting said cup, the arm or lever having a lug or projection designed to be engaged by said former lever, the pivoted arm having a finger acting as a scraper for said cup, the frame pivotally secured to said parallel side bars and carrying an axle at its outer end, the pulley secured on said axle, the belt encircling the same and said former pulley, and the driving-wheel also secured on said shaft and having opposite lugs, substantially as set forth.

In testimony whereof I affix my signature in presence of two witnesses.

ANDREW $\underset{\text{mark}}{\overset{\text{his}}{\times}}$ J. HALL.

Witnesses:
CHAS. E. BELL,
J. D. COUTS.